UNITED STATES PATENT OFFICE.

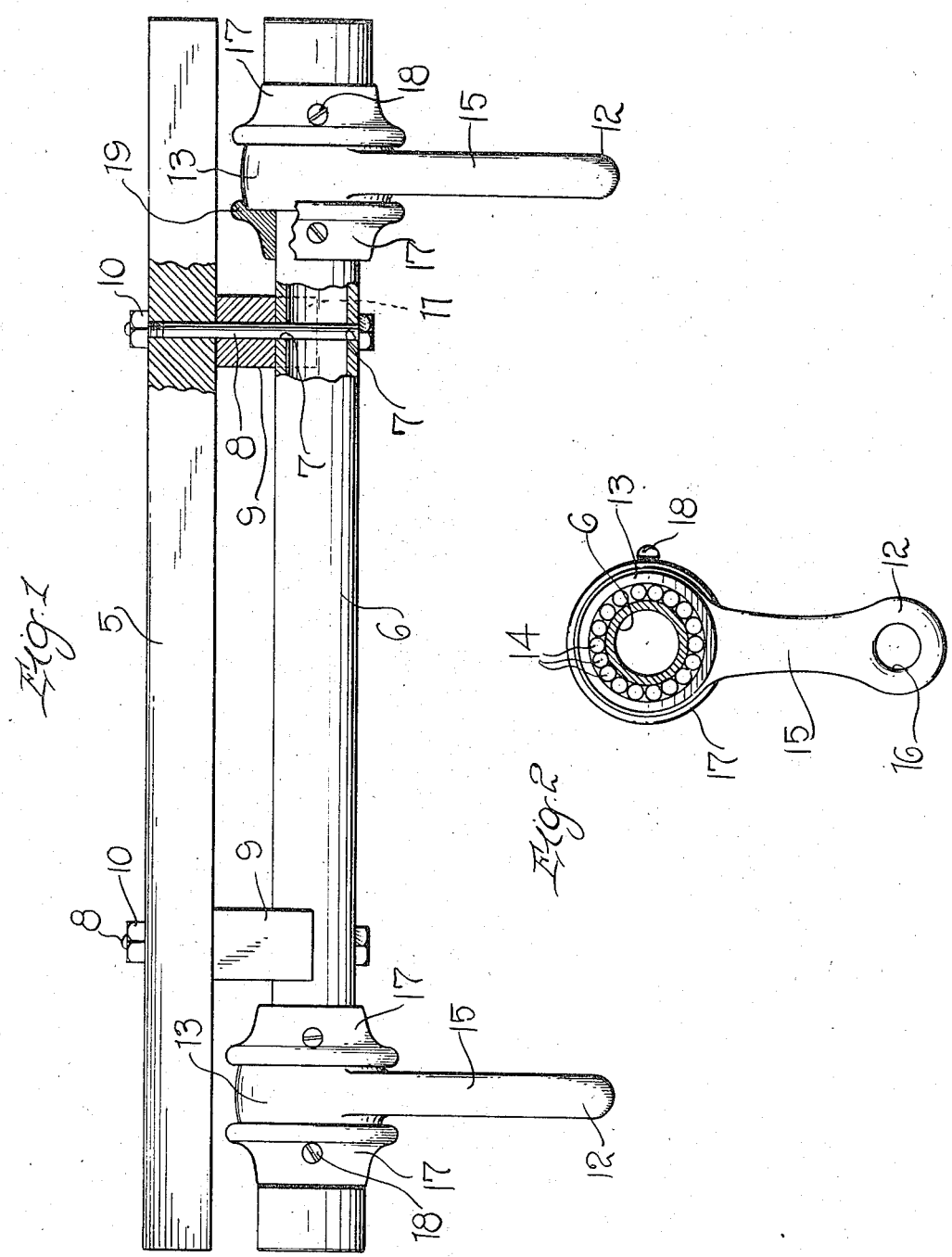

GUSTAF ENARSON, OF MONTCLAIR, NEW JERSEY.

BEARING FOR SWINGS.

1,147,081.

Specification of Letters Patent.

Patented July 20, 1915.

Application filed February 11, 1914. Serial No. 818,163.

*To all whom it may concern:*

Be it known that I, GUSTAF ENARSON, a citizen of the United States, residing at Montclair, in the county of Essex and State of New Jersey, have invented certain new and useful Improvements in Bearings for Swings, of which the following is a specification, reference being had to the accompanying drawings.

This invention relates to new and useful improvements in supports for swings and is particularly directed to the provision of bearing means for the suspension members at their upper ends.

It is the object of the present invention to provide means whereby the suspension members of a swing may be pivotally secured at their upper ends in such manner that friction will be to some extent eliminated with a consequent ease of action and durability of structure.

It is a further object of the present invention to provide a structure wherein this bearing means may be associated with any desired form of support, as for instance, a transverse beam.

It is a further object of the invention to provide a structure of this class which is strong and durable in use and which is of such simple structure that it is capable of ready and economical manufacture.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawing in which—

Figure 1 is a side elevation of the improved swing support, with parts thereof broken away in section to more clearly disclose the structure. Fig. 2 is a vertical transverse sectional view taken through the journal member of the device.

Corresponding and like parts are referred to in the following description and designated in all of the views of the accompanying drawing by like reference characters.

Referring now more particularly to the drawing, there is shown a swing support comprising a suitably supported horizontal beam 5. In the bearing provided, it is necessary that there be a cylindrical member to which it may be attached. Therefore, to provide this, a pipe section 6 is provided having at spaced intervals pairs of alining openings 7 through which a bolt 8 is passed, said bolt being also passed through a spacing block 9 disposed between the pipe section and beam and through the beam itself where it is secured to a nut 10. The face of the spacing block is concaved at 11 to receive the pipe section whereby a firm and compact structure throughout is provided which is at the same time of exceedingly simple design.

The bearing means whereby free pivotal connection of each of the suspension loops 12 is provided, comprises a sleeve member 13 positioned on the pipe section and having roller bearings 14 disposed between it and the pipe section. The sleeve is provided with a lateral arm 15 having an eye 16 formed in its free end whereby the suspension loop may be readily attached. To prevent lateral displacement of the sleeve or of the roller bearings, a collar 17 is provided on each side of the sleeve. Each of these collars is provided with a set screw 18 adapted to engage the pipe to prevent movement of the collar relative to the pipe, and each of the collars is provided with a lateral flange 19 embracing the outer periphery of the sleeve to thus prevent dust or other foreign matter from entering between the collars and sleeves and engaging between the roller bearings. By the provision of these collar portions holding the sleeves, it will be seen that a very simple structure is provided while at the same time the sleeves may be disposed toward or away from each other to suit existing conditions. It may be desired to associate these bearing members with a spring frame which is composed entirely, or in which the transverse supporting member is composed, of pipe sections. In this case, it is obvious that it would not be necessary to provide a second cylindrical member to support the bearings, as the bearings could be applied directly to the said pipe section.

From the foregoing, it is observed that a very simple structure has been provided which may be readily attached in position on any swing support and which suspends the swing in a very effectual manner whereby wear on the working part of the device is greatly lessened.

What is claimed is:

The combination with a fixed cylindrical supporting member having a uniform diameter throughout its entire length, of a member rotatably mounted on the supporting member and slidably adjustable therealong, and collars independently slidable on the supporting member and detachably secured in position thereon on opposite sides of said rotatable member, each of said collars extending over the adjacent edge of the supporting member and upon the face thereof, and anti-friction bearings disposed between the supporting member and the rotatable member and held in place by said collars but being removable laterally from said position when the collars are removed, said collars holding the rotatable member in adjusted position upon the supporting member.

In testimony whereof I hereunto affix my signature in the presence of two witnesses.

GUSTAF ENARSON.

Witnesses:
CARL J. STROMBERG,
R. M. HENING.